United States Patent
Nakajima

(10) Patent No.: US 7,456,863 B2
(45) Date of Patent: Nov. 25, 2008

(54) IMAGING APPARATUS, PHASE CONTROL METHOD, AND SYNCHRONIZATION METHOD

(75) Inventor: Takatsugu Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 725 days.

(21) Appl. No.: 11/025,919

(22) Filed: Jan. 3, 2005

(65) Prior Publication Data
US 2005/0174435 A1    Aug. 11, 2005

(30) Foreign Application Priority Data
Jan. 13, 2004    (JP)    ............... P2004-005736

(51) Int. Cl.
*H04N 5/232*    (2006.01)
*H04N 5/06*    (2006.01)

(52) U.S. Cl. .................. 348/211.14; 348/521

(58) Field of Classification Search ........ 348/143, 348/151–155, 211.99–211.5, 211.8, 211.9, 348/211.11, 211.14, 222.1, 500, 512–514, 348/516–522, 525, 536
See application file for complete search history.

(56) References Cited

U.S. PATENT DOCUMENTS

| | | | | |
|---|---|---|---|---|
| 4,214,261 A * | 7/1980 | Bazin et al. | ............... | 348/519 |
| 4,333,103 A * | 6/1982 | Koiwa et al. | ............... | 348/519 |
| 4,626,914 A * | 12/1986 | Breimer | ............... | 348/519 |
| 4,860,101 A * | 8/1989 | Pshtissky et al. | ............... | 348/518 |
| 5,303,050 A * | 4/1994 | Nishimura et al. | ............... | 348/211.2 |
| 5,389,968 A * | 2/1995 | Koyanagi et al. | ............... | 348/222.1 |
| 5,696,553 A * | 12/1997 | D'Alfonso et al. | ............... | 348/211.14 |
| 5,995,140 A * | 11/1999 | Cooper et al. | ............... | 348/159 |
| 6,392,698 B1 * | 5/2002 | Yokoyama | ............... | 348/222.1 |
| 6,437,824 B1 * | 8/2002 | Suzuki et al. | ............... | 348/222.1 |
| 6,493,034 B1 * | 12/2002 | Elberbaum | ............... | 348/512 |
| 6,727,957 B1 * | 4/2004 | Sato | ............... | 348/526 |
| 6,795,124 B1 * | 9/2004 | Gamo et al. | ............... | 348/525 |
| 6,977,677 B1 * | 12/2005 | Shinohara | ............... | 348/211.5 |

FOREIGN PATENT DOCUMENTS

| | | |
|---|---|---|
| JP | 4-54086 | 2/1992 |
| JP | 2002-261699 | 9/2002 |

* cited by examiner

*Primary Examiner*—Sinh Tran
*Assistant Examiner*—Timothy J Henn
(74) *Attorney, Agent, or Firm*—Oblon, Spivak, McClelland, Maier & Neustadt, P.C.

(57) ABSTRACT

An imaging apparatus includes a camera device, a signal processor that receives a video signal from the camera, and a connection cable connecting the camera device and the signal processor. The camera device includes a first phase controller that compares the phase of a synchronization signal transmitted from the signal processor with the phase of an internal signal generated by the camera device, and that synchronizes the phase of the internal signal with the phase of the synchronization signal, a video synchronization signal generator that generates a video synchronization signal for the video signal based on the internal signal, and a signal transmitter that transmits the video signal. The signal processor includes a second phase controller that compares the phase of the video synchronization signal with the phase of the synchronization signal, and that synchronizes the phase of the video synchronization signal with the phase of the synchronization signal.

13 Claims, 11 Drawing Sheets

FIG. 2

IMAGING APPARATUS, PHASE CONTROL METHOD, AND SYNCHRONIZATION METHOD

BACKGROUND OF THE INVENTION

1. Field of the Invention

The present invention relates to an imaging apparatus including an optical fiber cable. More specifically, the present invention relates to an imaging apparatus, to a phase control method therefor, and to a synchronization method therefor.

2. Description of the Related Art

Various imaging systems (imaging apparatuses) have been commercially available for the purpose of security. One known imaging system is a monitoring system in which video from one or a plurality of cameras installed in a place, such as an office building or a house, is observed by an operator on a monitor.

This type of imaging apparatus or monitoring system has a network that carries data, such as a video signal generated by video captured with the camera or cameras, over which the data is transmitted from the camera or cameras to the monitor (see, for example, Japanese Unexamined Patent Application Publication No. 7-212748).

In the imaging apparatus, the network is established using a multi-core cable, which requires time-consuming installation because of its complicated connection, and the multi-core cable typically carries analog signals. Video signals transmitted over a long distance can become degraded, thus making it difficult to clearly display video on a monitor distant from the camera or cameras.

SUMMARY OF THE INVENTION

Accordingly, it is an object of the present invention to provide a new and improved imaging apparatus capable of transmitting video via an optical fiber cable, a phase control method therefor, and a synchronization method therefor.

In one aspect, the present invention provides an imaging apparatus including at least one camera device that photographs an object, a signal processor that receives a video signal from the camera device, and a connection cable connecting the camera device and the signal processor. The camera device includes a first phase controller that compares the phase of a synchronization signal transmitted from the signal processor with the phase of an internal signal generated by the camera device, and that controls the phase of the internal signal so as to be synchronized with the phase of the synchronization signal, a video synchronization signal generator that generates a video synchronization signal that is a synchronization signal for the video signal based on the internal signal whose phase is synchronized with the phase of the synchronization signal transmitted from the signal processor, and a signal transmitter that transmits via the connection cable at least a video signal that includes the video synchronization signal or a video signal that does not include the video synchronization signal. The signal processor includes a second phase controller that compares the phase of the video synchronization signal with the phase of the synchronization signal transmitted from the signal processor, and that controls the phase of the video synchronization signal so as to be synchronized with the phase of the synchronization signal.

According to the present invention, the phases of signals exchanged via the connection cable between the camera device and the signal processor are synchronized. Thus, if the connection cable causes a transmission delay, a video signal transmitted from the camera device can be transmitted to the signal processor without any phase difference.

The video synchronization signal may be a horizontal synchronization signal. Thus, it is only required to control one video synchronization signal so that no phase difference occurs, leading to high-efficiency phase synchronization control.

The connection cable may be an optical fiber cable. This allows a video signal, etc., to be transmitted at high rate between the camera device and the signal processor that are distant from each other.

The signal transmitter may include a multiplexer that multiplexes a video signal including at least a video synchronization signal.

The multiplexer may multiplex the video signal and the video synchronization signal so as to be transmitted via the optical fiber cable.

The phase of the synchronization signal may be synchronized with the phase of an external synchronization signal transmitted from an external device. Thus, control from the external device, such as switching of video, can be performed timely.

The second phase controller may output a second transmission synchronization signal whose phase is synchronized with the phase of an external synchronization signal transmitted from an external device. Since the phase of the second transmission signal is synchronized with the phase of the video signal, an instruction signal from the signal processor can be switched timely according to the phase of the video signal.

The signal processor may further include a signal transmitter that transmits the second transmission synchronization signal via the connection cable.

The video synchronization signal may be at least a horizontal synchronization signal or at least one horizontal reference signal generated based on the horizontal synchronization signal.

In another aspect, the present invention provides an imaging apparatus including at least one camera device that photographs an object, a signal processor that receives a video signal from the camera device, and a connection cable connecting the camera device and the signal processor. The camera device includes a first synchronization signal transmitter that transmits a first synchronization signal to the signal processor via the connection cable so that a signal transmitted from the camera device can be received by the signal processor, and a first synchronization determining unit that determines whether or not a second synchronization signal for allowing a signal transmitted from the signal processor to be received by the camera device has been transmitted from the signal processor, and that determines that synchronization from the signal processor to the camera device is established when the second synchronization signal has been transmitted from the signal processor. The signal processor includes a second synchronization determining unit that determines whether or not the first synchronization signal has been transmitted from the camera device, and that determines that synchronization from the camera device to the signal processor is established when the first synchronization signal has been transmitted from the camera device, and a second synchronization signal transmitter that transmits the second synchronization signal to the camera device via the connection cable. Synchronization between the camera device and the signal processor is automatically established.

According to the present invention, the synchronization determining units of the camera device and the signal processor allow synchronization to be established from the camera device to the signal processor and from the signal processor to the camera device. Thus, synchronization is automatically established between the camera device and the signal processor without any special synchronization processing.

The first synchronization signal transmitter and the second synchronization signal transmitter may transmit the first and second synchronization signals, respectively, when the synchronization is disturbed or when the imaging apparatus is powered on. Thus, when synchronization is disturbed or when the imaging apparatus is powered on, synchronization can automatically be established to constantly transmit signals. The connection cable may be an optical fiber cable.

In another aspect, the present invention provides a phase control method for an imaging apparatus including at least one camera device that photographs an object, a signal processor that receives a video signal from the camera device, and a connection cable connecting the camera device and the signal processor. The phase control method includes comparing the phase of a synchronization signal transmitted from the signal processor with the phase of an internal signal generated by the camera device, controlling the phase of the internal signal so as to be synchronized with the phase of the synchronization signal, generating a video synchronization signal that is a synchronization signal for the video signal based on the internal signal whose phase is synchronized with the phase of the synchronization signal, transmitting a video signal including at least the video synchronization signal from the camera device to the signal processor via the connection cable, comparing the phase of the video synchronization signal with the phase of the synchronization signal, and controlling the phase of the video synchronization signal so as to be synchronized with the phase of the synchronization signal.

The video synchronization signal may be a horizontal synchronization signal. The connection cable may be an optical fiber cable.

The camera device may multiplex at least the video signal. The phase of the synchronization signal may be synchronized with the phase of an external synchronization signal transmitted from an external device.

The signal processor may output a second transmission synchronization signal whose phase is synchronized with the phase of an external synchronization signal transmitted from an external device.

In another aspect, the present invention provides a synchronization method for an imaging apparatus including at least one camera device that photographs an object, a signal processor that receives a video signal from the camera device, and a connection cable connecting the camera device and the signal processor. The synchronization method includes transmitting a first synchronization signal from the camera device to the signal processor via the connection cable so that a signal transmitted from the camera device can be received by the signal processor, determining whether or not the first synchronization signal has been transmitted from the camera device, determining that synchronization from the camera device to the signal processor is established when the first synchronization signal has been transmitted from the camera device, transmitting a second synchronization signal from the signal processor to the camera device via the connection cable so that a signal transmitted from the signal processor can be received by the camera device, determining whether or not the second synchronization signal has been transmitted from the signal processor, and determining that synchronization from the signal processor to the camera device is established when the second synchronization signal has been transmitted from the signal processor.

The first synchronization signal or the second synchronization signal may be transmitted when the synchronization is disturbed or when the imaging apparatus is powered on. The connection cable may be an optical fiber cable.

In another aspect, the present invention provides an imaging apparatus including at least one camera device that photographs an object, a signal processor that receives a video signal from the camera device, and a connection cable connecting the camera device and the signal processor. The camera includes a first phase controller that compares the phase of a first transmission synchronization signal for transmitting a signal from the signal processor via the connection cable and the phase of a second transmission synchronization signal for transmitting a signal from the camera device via the connection cable, and that controls the phase of the second transmission synchronization signal so as to be synchronized with the phase of the first transmission synchronization signal, a video synchronization signal generator that generates a video synchronization signal that is a synchronization signal for the video signal based on the second transmission synchronization signal whose phase is synchronized with the phase of the first transmission synchronization signal, and a signal transmitter that transmits the video signal including at least the video synchronization signal via the connection cable. The signal processor includes a second phase controller that compares the phase of the video synchronization signal with the phase of the synchronization signal, and that outputs the first transmission synchronization signal wherein the phase of the video synchronization signal is controlled so as to be synchronized with the phase of the synchronization signal.

According to the present invention, therefore, in an imaging apparatus including an optical fiber cable, synchronization can be established, thus allowing a high-quality video signal to be transmitted to a distant place.

The present invention is applicable to an imaging apparatus including an optical fiber cable, to a phase control method performed via the optical fiber cable, and to a synchronization method performed via the optical fiber cable.

BRIEF DESCRIPTION OF THE DRAWINGS

FIG. 2 is a schematic block diagram of an imaging apparatus of the related art;

DESCRIPTION OF THE PREFERRED EMBODIMENTS

Figure 1:
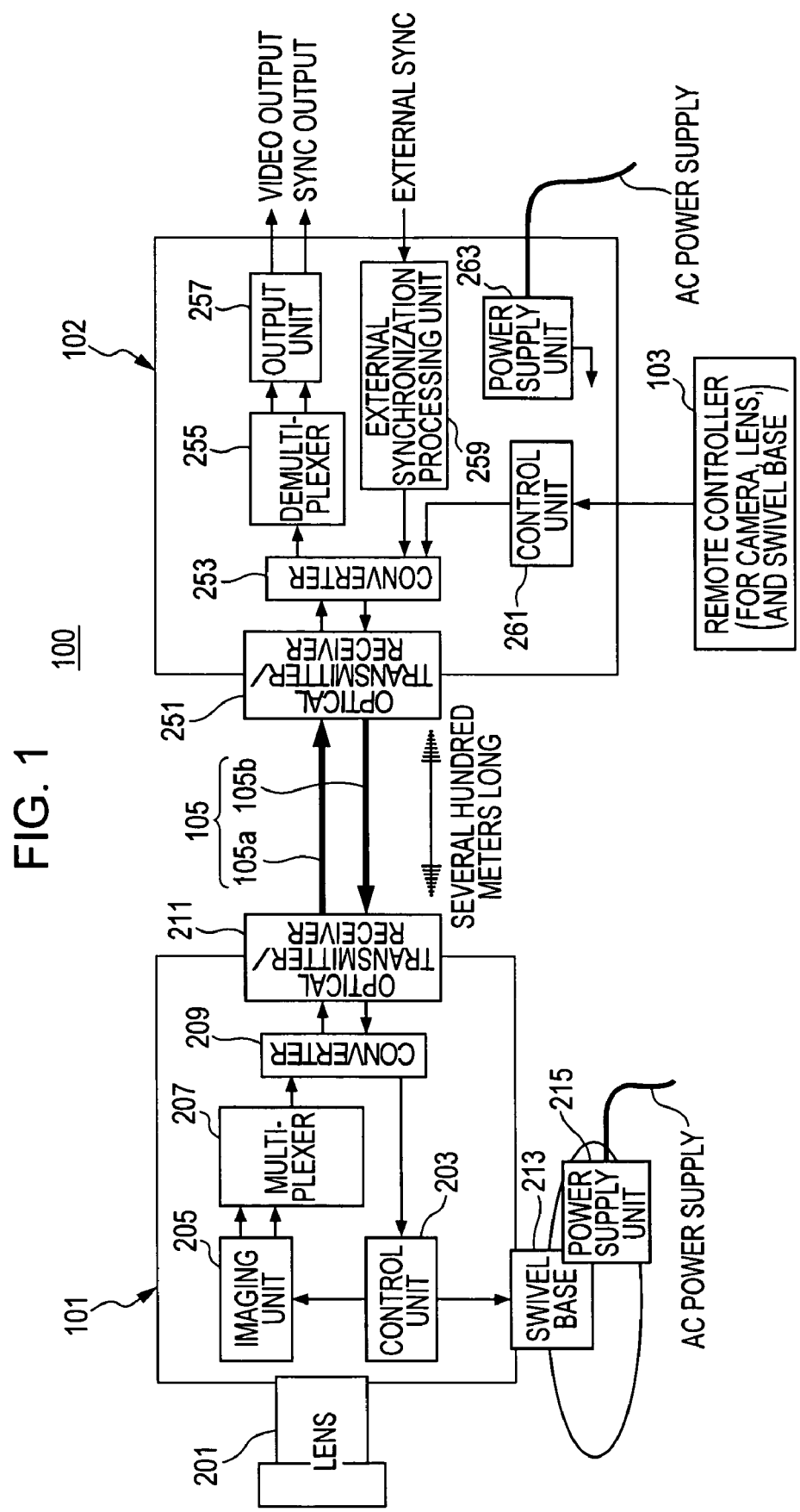
FIG. 1 is a schematic block diagram of an imaging apparatus according to an embodiment of the present invention.

Preferred embodiments of the present invention will now be described in detail with reference to the accompanying drawings. In the following description and throughout the accompanying drawings, components having substantially the same function and structure are given the same reference numerals, and a redundant description thereof is thus omitted.

FIG. 1 is a schematic block diagram of an imaging apparatus 100 according to an embodiment of the present invention.

As shown in FIG. 1, the imaging apparatus 100 includes a camera device 101, a signal processor 102, a remote controller 103, and an optical fiber cable 105. The imaging apparatus 100 may include a plurality of camera devices 101, signal processors 102, and remote controllers 103.

The camera device 101 photographs an object to generate a video signal, and performs processing, such as multiplexing, on the generated video signal. The resulting video signal is then transmitted to the signal processor 102 via the optical fiber cable 105. The signal processor 102 performs processing, such as demultiplexing, on the multiplexed video signal, and outputs the resulting video signal to a display device (not shown). The remote controller 103 is used to remotely control motions of the camera device 101, such as panning, tilting, and zooming. The signal processor 102 is, for example, a relay device, and may further relay the received video signal to another signal processor 102.

The camera device 101 includes a lens 201, a control unit 203 for controlling the components, such as the lens 201, and an imaging unit 205. The imaging unit 205 includes an imaging device for capturing an image of an object, and a video signal processing circuit. The camera device 101 further includes a multiplexer 207, a converter 209 for converting a parallel signal to a serial signal, and an optical transmitter/receiver 211 for transmitting and receiving an optical signal via the optical fiber cable 105. The camera device 101 further includes a swivel base 213 for controlling the photographing direction of the camera device 101, and a power supply unit 215. In an embodiment, the converter 209 may be a serializer/deserializer (SERDES).

The camera device 101 may be any camera capable of transmitting and receiving signals via at least the optical fiber cable 105, and may be a monitoring camera, a remote monitoring camera, a digital still camera, a digital video camera, a portable phone equipped with a digital still camera, or a portable phone equipped with a digital video camera.

The imaging unit 205 outputs video of an object captured via the lens 201 in the form of a video signal constituted by a Y signal (luminance signal) and a C signal (chrominance signal) each having 8-bit digital data.

The control unit 203 controls the lens 201 to adjust the aperture or the shutter speed, and also controls a camera signal processor (not shown) that performs brightness correction and that encodes a video signal into a digital signal. The control unit 203 may be a microcomputer.

The converter 209 is formed of an integrated circuit (IC) for performing parallel-to-serial or serial-to-parallel conversion on an input signal. The details of the converter 209 are described below.

The optical transmitter/receiver 211 converts an input electrical signal into an optical signal or converts an input optical signal into an electrical signal, and outputs the converted signal. The optical transmitter/receiver 211 may be an SFP (Small Form Factor Pluggable) module.

The SFP module is a laser transceiver module complying with SFP, which is one of the communication-industry standards. The SFP module is a module with pluggable connection to a substrate using a specific 20-pin connector. The SFP module has a plurality of interchangeable forms, e.g., the communication rate, the laser waveform, or the optical connector type. For example, the SFP module may be a multi-mode fiber SFP module with an LC optical connector, having a communication rate of 2.5 Gbps and a laser waveform of 850 μm.

The swivel base 213 includes a swivel base controller (not shown) for controlling the swivel base 213 so as to be rotated in the vertical and horizontal directions. The swivel base controller is controlled by the control unit 203.

The signal processor 102 includes an optical transmitter/receiver 251, a converter 253, a demultiplexer 255, an output unit 257, an external synchronization processing unit 259, a control unit 261 for controlling the components, and a power supply unit 263 for supplying power to the signal processor 102. The optical transmitter/receiver 251 and the converter 253 have substantially the same structure as that of the optical transmitter/receiver 211 and the converter 209 of the camera device 101, respectively.

The demultiplexer 255 separates the multiplexed video signal, synchronization signal, etc., input from the camera device 101 into the individual signals. The demultiplexer 255 further demodulates a digital video signal into an analog video signal. The output unit 257 outputs the digital video signal, the analog video signal, or the synchronization signal, such as a video synchronization signal, to an external device, such as a display device.

The external synchronization processing unit 259 receives an external synchronization signal from an external device, such as a switcher, and locks the phases of the external synchronization signal and the video synchronization signal input from the camera device 101, which is a horizontal synchronization signal HD or a vertical synchronization signal VD. The details of the phase locking operation are described below.

The control unit 261 may be a microcomputer that controls processing performed by the components. The control unit 261 receives a control signal from the remote controller 103 to remotely control processing of the camera device 101, such as exposure adjustment and white balance setting.

In the present embodiment, the signal processor 102 may include a multiplexer. Thus, a control signal from the remote controller 103 may be multiplexed and the multiplexed signal may be transmitted to the camera device 101.

In the present embodiment, the camera device 101 may include a demultiplexer. Thus, the camera device 101 may receive a multiplexed control signal or instruction signal transmitted from the signal processor 102.

The optical fiber cable 105 (105a and 105b) may be any cable depending upon the form of the optical transmitters/receivers 211 and 251. In the present embodiment, the optical fiber cable 105 is, for example, a multi-mode two-fiber cable with Duplex LC optical connectors at both ends.

Figure 2:
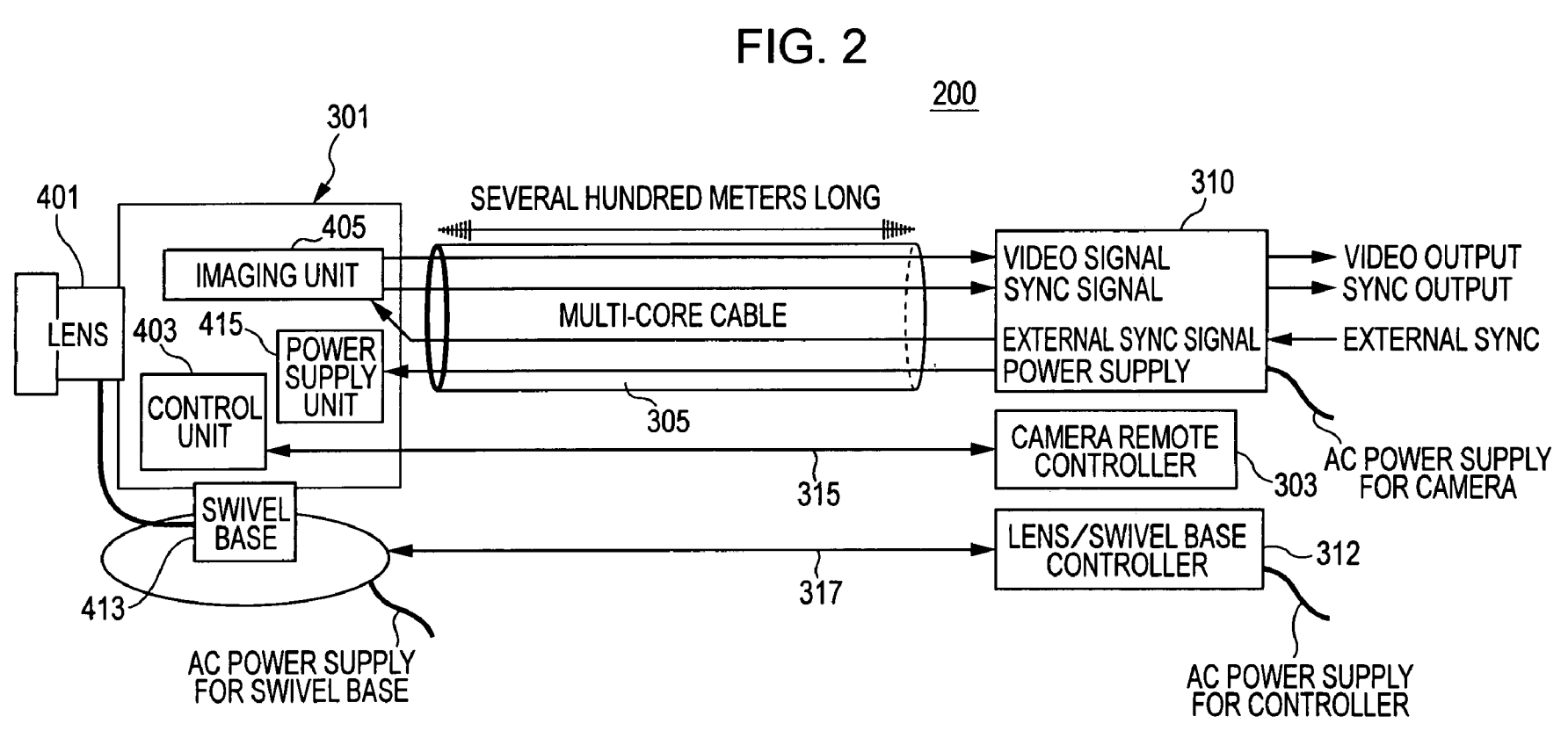

FIG. 2 is a schematic block diagram of an imaging apparatus 200 of the related art.

The imaging apparatus 200 of the related art requires multiple complicated lines for exchanging a plurality of signals in order to transmit a video signal from a camera device 301 to a distant place or to remotely operate the camera device 301.

As shown in FIG. 2, for example, a video signal and a synchronization signal, such as a video synchronization signal, must be transmitted from the camera device 301 to a camera power supply unit 310. An external synchronization signal must be transmitted from the camera power supply unit 310 to the camera device 301, and the power supply must also be transmitted to the camera device 301.

A multi-core cable 305 is connected between the camera device 301 and the camera power supply unit 310 to exchange a plurality of signals between the camera device 301 and the camera power supply unit 310 and to supply power.

As shown in FIG. 2, a dedicated communication cable 315 is connected between the camera device 301 and a camera remote controller 303 to exchange signals. A dedicated communication cable 317 is connected between a swivel base 413 and a controller 312 for controlling a lens 401 or the swivel base 413 to exchange a swivel base control signal for controlling the swivel base 413 or the like.

Thus, a video signal of video captured by the camera device 301 must be transmitted to, for example, a place several hundred meters distant from the camera device 301 using the three long cables, i.e., the multi-core cable 305 and the communication cables 315 and 317.

In the imaging apparatus 200 of the related art, it is complicated to connect a long multi-core cable. Moreover, a thick heavy multi-core cable is required for preventing a reduction of a power supply voltage or degradation of signals, and time-consuming cable installation is therefore required.

The long multi-core cable used in the imaging apparatus 200 of the related art is costly, and carries analog signals. Thus, degradation of signals, particularly, video signals, due to long-distance transmission, e.g., deterioration in frequency characteristics, induced noise from other electrical cables, etc., is not negligible.

Since the signals to be transmitted and received are carried on corresponding dedicated lines, the cable design itself must be changed to change or add a signal, resulting in low flexibility and extensibility. Moreover, cable extension can induce spurious radiation.

If an external synchronization signal from an external device, such as a switcher, is input to the camera power supply unit 310 to apply synchronization, the camera device 301 is formed of a phase locked loop (PLL) because it is difficult that the overall imaging apparatus 200 is constituted by a PLL in view of spurious radiation, etc. In this case, phase locking adjustment is required for signal delay on transmission channels when exchanging signals via a cable or the like.

Figure 3:
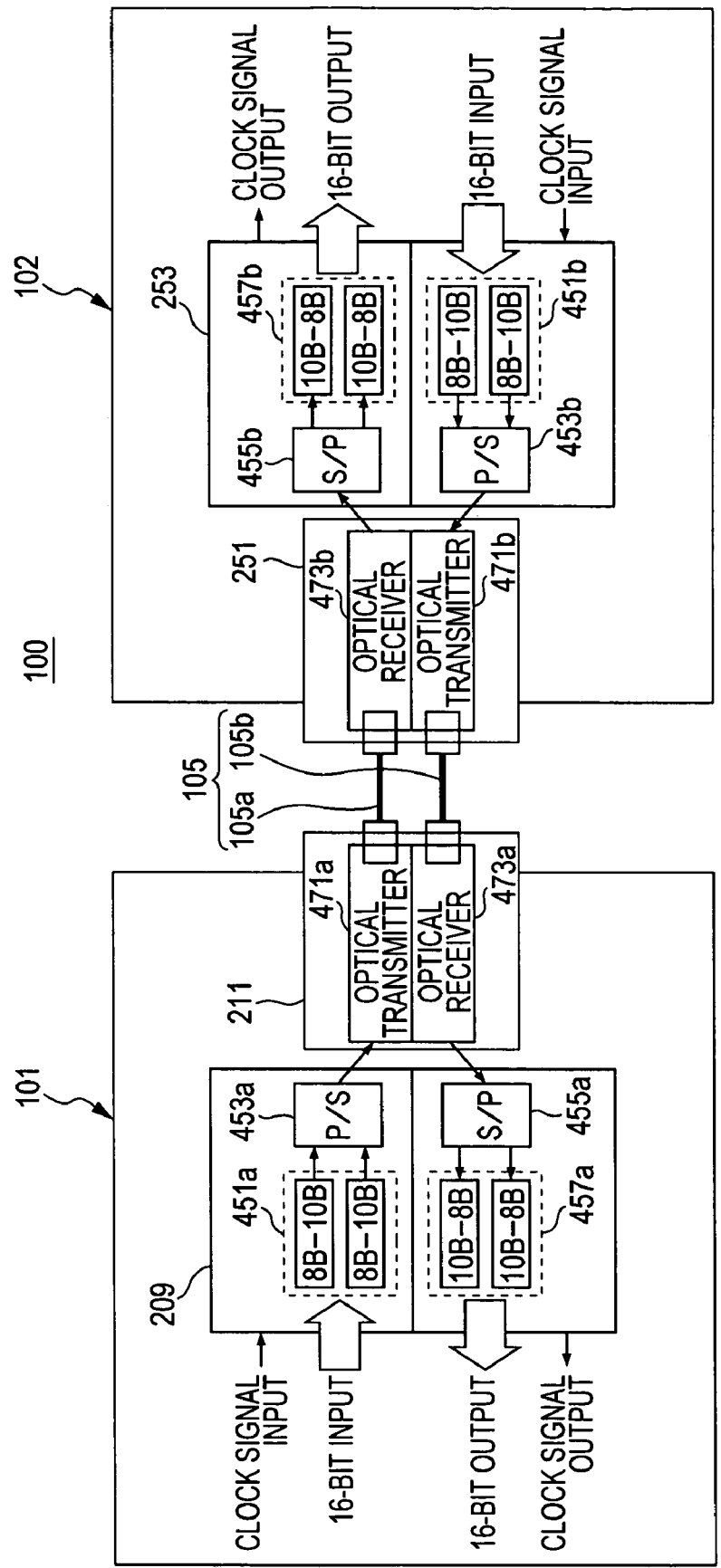
FIG. 3 is a schematic diagram showing optical signal transmission in the imaging apparatus according to the embodiment of the present invention.

FIG. 3 is a schematic diagram showing optical signal transmission in the imaging apparatus 100 according to the embodiment of the present invention.

The imaging apparatus 100 shown in FIG. 3 provides full-duplex optical signal transmission and reception. That is, bi-directional transmission and reception is carried out from the camera device 101 to the signal processor 102 and from the signal processor 102 to the camera device 101.

As shown in FIG. 3, the camera device 101 and the signal processor 102 are connected via the optical fiber cable 105, and each of the camera device 101 and the signal processor 102 includes a converter (i.e., the converters 209 and 253), and an optical transmitter/receiver (i.e., the optical transmitters/receivers 211 and 251).

Each of the converters 209 and 253 has an input section to which a multiplexed signal having 16 bits is input, and an output section from which a 16-bit signal electrically converted from the optical signal is output.

The input section includes a bit converter 451 (451a and 451b), and a parallel-serial converter 453 (453a and 453b). The output section includes a bit converter 457 (457a and 457b), and a serial-parallel converter 455 (455a and 455b).

The bit converter 451 divides a parallel input signal having 16 bits into two 8-bit signals, and converts the 8-bit signals into 10-bit signals, called 8B (bit)/10B (bit) conversion. The 8B/10B conversion is an encoding scheme for, for example, IEEE1394b. The bit converter 457 performs an opposite conversion to that of the bit converter 451, that is, conversion from 10-bit signals into 8-bit signals.

The parallel-serial converter 453 converts the 10-bit parallel signals, i.e., a total of 20 bits of parallel signals, into a serial signal. The serial-parallel converter 455 converts a 20-bit serial input signal transmitted from the optical transmitter/receiver 211 or 251 into 10-bit parallel signals.

Each of the optical transmitters/receivers 211 and 251 includes an optical transmitter 471 (471a and 471b) and an optical receiver 473 (473a and 473b). The optical transmitter 471 converts a serial electrical signal into an optical signal, and transmits the optical signal via the optical fiber cable 105. The optical receiver 473 receives the optical signal via the optical fiber cable 105, and converts the optical signal into an electrical signal.

A full-duplex data transmission from the camera device 101 to the signal processor 102 via the optical fiber cable 105a will now be described.

In the camera device 101, a multiplexed parallel signal, such as a video signal, is input to a parallel input port of the converter 209. The input parallel signal is encoded with 8B/10B conversion by the bit converter 451a, and is then converted by the parallel-serial converter 453a into a serial signal, which is then output.

The optical transmitter 471a converts the serial signal from the parallel-serial converter 453a into an optical signal, and transmits the optical signal via the optical fiber cable 105a.

In the signal processor 102, the optical receiver 473b receives the optical signal transmitted from the camera device 101, and converts the optical signal into an electrical signal. The converted electrical signal is input to a serial input port of the converter 253.

The serial input signal is converted by the serial-parallel converter 455b into parallel signals, and is then subjected to 10B/8B conversion by the bit converter 457b. The converted 8-bit signals constitute a 16-bit output signal, which is then output. In this way, data transmission via the optical fiber cable 105 is performed. A data transmission process from the signal processor 102 to the camera device 101 via the optical fiber cable 105b is opposite to the data transmission process from the camera device 101 to the signal processor 102 described above.

Figure 4:
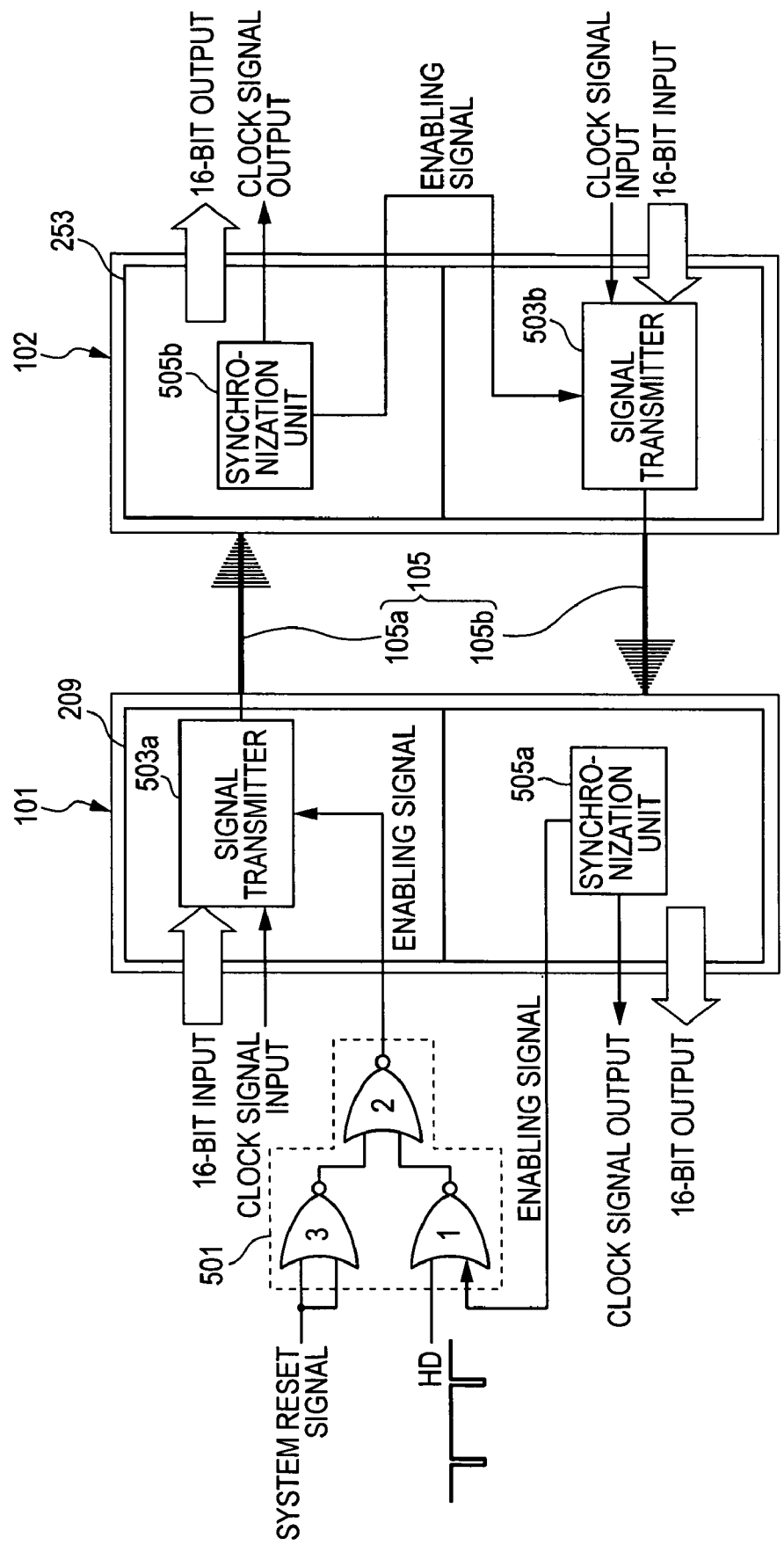
FIG. 4 is a schematic diagram showing synchronization performed in the imaging apparatus according to the embodiment of the present invention.

FIG. 4 is a schematic diagram of the imaging apparatus 100 that allows word synchronization according to the embodiment of the present invention.

A signal that is exchanged between the camera device 101 and the signal processor 102 via the optical fiber cable 105 is a serial signal having 20 bits per word, as described above. Since the serial signal contains no synchronization signal for transmission and reception, synchronization is not established between a transmitter and a receiver. A signal transmitted from the transmitter cannot be successfully received by the receiver.

The receiver cannot recognize the spacing or boundaries between words in the transmitted bit stream. It is therefore necessary to establish word synchronization between the transmitter and the receiver. A word is a sequence of 20 bits, by way of example. In the following description, the term word is used; however, the present invention is not limited to this terminology.

In the imaging apparatus 100 shown in FIG. 4, the camera device 101 includes an enabling signal generator circuit 501 that generates an enabling signal for permitting generation of a COMMA signal, and a converter 209, and the signal processor 102 includes a converter 253.

The COMMA signal is a synchronization signal (or sync signal) for allowing word synchronization between the camera device 101 and the signal processor 102, having a sequence of bits specific to word synchronization.

Each of the converters 209 and 253 includes a signal transmitter 503 (503*a* and 503*b*) and a synchronization unit 505 (505*a* and 505*b*).

The signal transmitter 503*a* has a switching function for outputting one of two signals, e.g., a COMMA signal. When an enabling signal is input from the enabling signal generator circuit 501, that is, in a low state, the signal transmitter 503*a* generates and outputs a COMMA signal. When an enabling signal is not input but normal data (e.g., a 16-bit signal) is input, that is, in a high state, the signal transmitter 503*a* outputs the input signal having 16 or 20 bits.

The signal transmitter 503*b* has substantially the same structure as that of the signal transmitter 503*a*, except that an input enabling signal is transmitted from the synchronization unit 505*b*.

The synchronization unit 505 (505*a* and 505*b*) checks the data received via the optical fiber cable 105, and becomes high when the received data is normal data. If the received data is an abnormal signal, e.g., a COMMA signal, the synchronization unit 505 becomes low and outputs an enabling signal. Accordingly, when the synchronization unit 505 determines that the signal transmitted from the transmitter is a COMMA signal, word synchronization for data transmission from the transmitter to the receiver is established.

Figure 5:
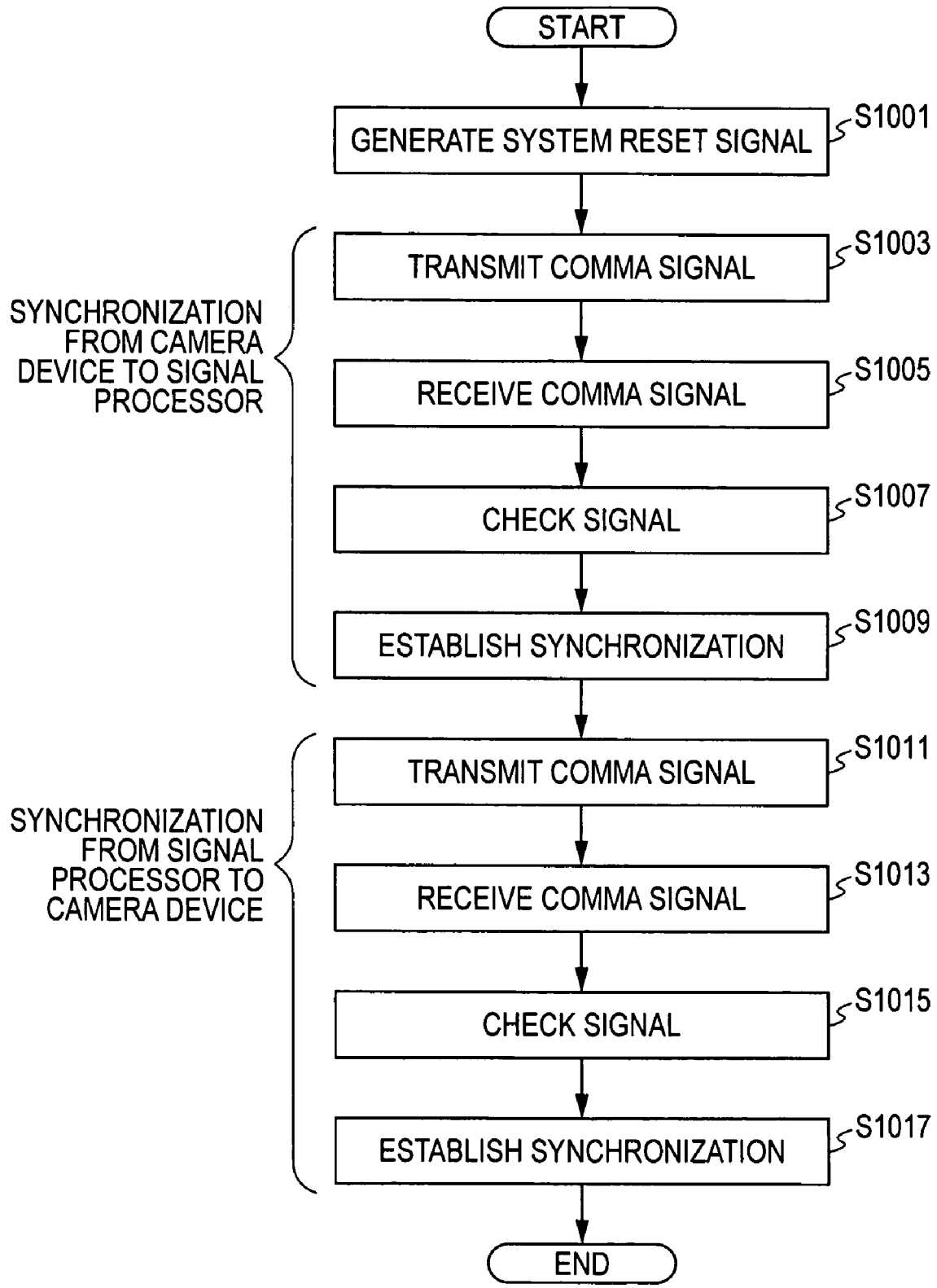
FIG. 5 is a flowchart schematically showing a synchronization process performed in the imaging apparatus according to the embodiment of the present invention.

FIG. 5 is a flowchart schematically showing a word synchronization process according to the present embodiment.

Word synchronization is established, for example, after the imaging apparatus 100 is partially or entirely powered on or when word synchronization established is disturbed by some reason. In such a case, the COMMA signal output from the transmitter allows the receiver to establish word synchronization, leading to correct data transmission and clock reproduction.

In general computer networks, intermittent data transmission is performed, and it is therefore necessary to generate a COMMA signal each time data transfer begins to establish word synchronization with a transmission destination.

However, the imaging apparatus 100 according to the present embodiment performs sequential transmission of data, such as video signals. Therefore, a COMMA signal is generated one time after the imaging apparatus 100 is powered on, and the COMMA signal is exchanged to establish word synchronization.

As shown in FIG. 5, in the word synchronization process, when the imaging apparatus 100 is powered on, first, a system reset signal is generated by the camera device 101 (step S1001).

When the power is turned on, as shown in FIG. 4, a system reset signal is generated for a certain period of time, and a terminal of the enabling signal generator circuit 501 connected to the converter 209 is turned to low via NOR gates 3 and 2 for the period of time. Thus, an enabling signal is output from the enabling signal generator circuit 501.

When the enabling signal is input, the signal transmitter 503*a* generates a COMMA signal. The generated COMMA signal is subjected to predetermined processing, such as 10B/8B conversion, described above, and is then transmitted via the optical fiber cable 105*a* (step S1003).

In the signal processor 102, the converter 253 receives the COMMA signal transmitted from the camera device 101 (step S1005), and outputs the received signal to the synchronization unit 505*b*. The synchronization unit 505*b* determines whether or not the COMMA signal has been received (step S1007). If the COMMA signal has been received, the synchronization unit 505*b* outputs a low signal as an enabling signal from an output terminal.

When the enabling signal is output from the synchronization unit 505*b*, the synchronization unit 505*b* establishes synchronization from the camera device 101 to the signal processor 102 (step S1009).

An input terminal of the signal transmitter 503*b* connected to the synchronization unit 505*b* also becomes low, and receives the enabling signal. Thus, the signal transmitter 503*b* also generates a COMMA signal. The generated COMMA signal is transmitted from the signal processor 102 to the camera device 101 (step S1011).

In the camera device 101, the converter 209 receives the COMMA signal transmitted from the signal processor 102 (step S1013), and outputs the received signal to the synchronization unit 505*a*. The synchronization unit 505*a* determines whether or not the COMMA signal has been received (step S1015). If the COMMA signal has been received, the synchronization unit 505*a* outputs a low signal as an enabling signal from an output terminal.

When the enabling signal is output from the synchronization unit 505*a*, the synchronization unit 505*a* establishes synchronization from the signal processor 102 to the camera device 101 (step S1017).

Therefore, the COMMA signals transmitted from the signal transmitters 503*a* and 503*b* to the signal processor 102 and the camera device 101 allow word synchronization to be established between the camera device 101 and the signal processor 102. The synchronization mode transitions to a normal data transmission mode when generation of the system reset signal is completed.

An automatic recovery operation for automatically establishing word synchronization when a normal data transmission state is not maintained because word synchronization is disabled due to disturbance, etc., will now be described. The horizontal sync signal HD shown in FIG. 4, which is a video sync signal, is a negative pulse generated at certain intervals while the camera device 101 is in a power-on state.

In data transmission from the camera device 101 to the signal processor 102 or from the signal processor 102 to the camera device 101, if word synchronization is disturbed, as described above, the output terminal of the synchronization unit 505 of the camera device 101 or the signal processor 102 becomes low, and an enabling signal is output from the synchronization unit 505.

If the synchronization unit 505*a* of the camera device 101 outputs an enabling signal to the enabling signal generator circuit 501 and the HD pulse input to the enabling signal circuit unit 501 becomes low, the input terminal of the signal transmitter 503*a* of the camera device 101 is turned to low via the NOR gates 1 and 2 for a period of time corresponding to the low state of the HD pulse. Thus, a similar operation to that in the above-described event where the system reset signal is generated is performed, and word synchronization is automatically recovered between the camera device 101 and the signal processor 102.

The word synchronization is automatically recovered when word synchronization, established when the imaging apparatus 100 is powered on, is disturbed by any reason, thereby constantly providing stable full-duplex optical fiber transmission between the camera device 101 and the signal processor 102.

Figure 6:
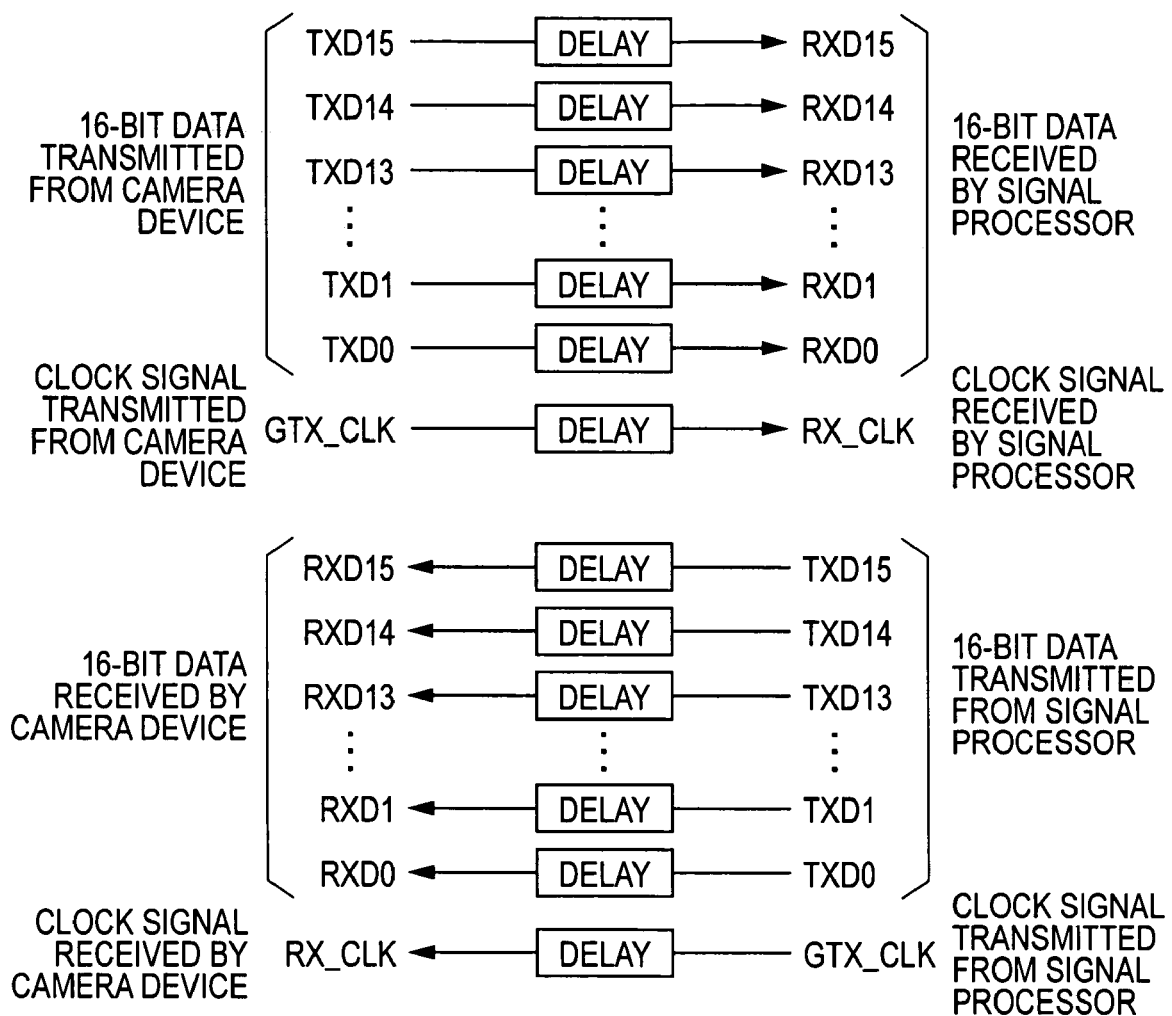
FIG. 6 is a schematic diagram of an equivalent circuit of transmission channels of the imaging apparatus according to the embodiment of the present invention.

When the imaging apparatus 100 is in a stable operation mode, the imaging apparatus 100 serves as a transmission system in which bits (including clock signals) at a transmitter input port and a receiver output port of the camera device 101 or the signal processor 102 are connected over delay lines. This is equivalent to transmission channels including signal delay, shown in FIG. 6. FIG. 6 is a schematic diagram of an equivalent circuit of the transmission channels of the imaging apparatus 100 according to the embodiment of the present invention.

In a system circuit shown in FIG. 6, each of the transmission channels from the camera device 101 to the signal processor 102 and from the signal processor 102 to the camera device 101 is connected by 16 delay lines and one delay line for clock signal transmission.

Figure 7:
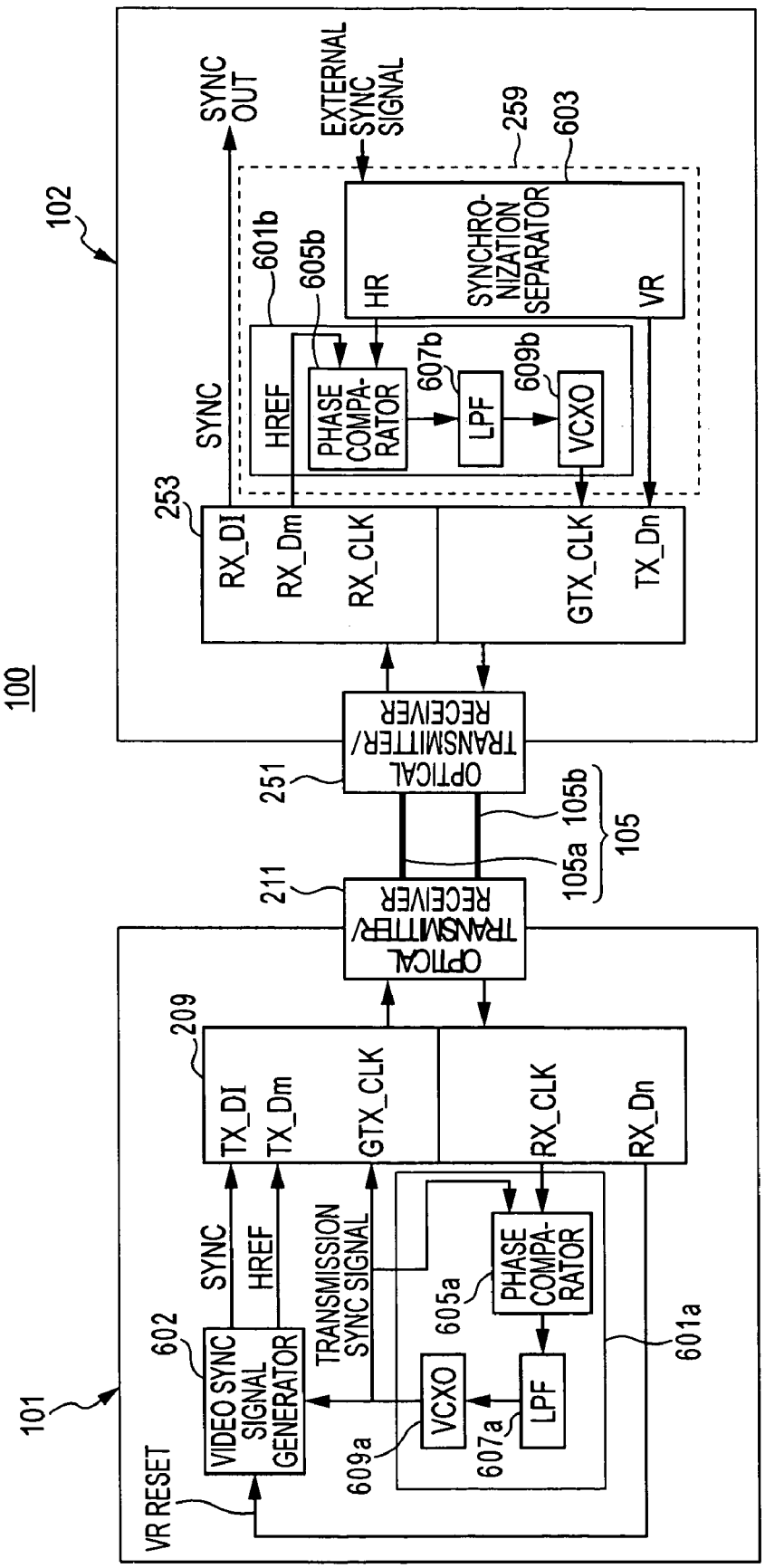
FIG. 7 is a schematic block diagram of an imaging apparatus that performs external synchronization according to the embodiment of the present invention.

FIG. 7 is a schematic block diagram of the imaging apparatus 100 that allows external synchronization according to the embodiment the present invention.

In this embodiment, external synchronization is performed by automatically locking the phase of a video sync signal transmitted over a long distance from the camera device 101 via the optical fiber cable 105 to the phase of an external sync signal input to the signal processor 102 from an external device without manual phase adjustment using an oscilloscope. The present invention is not limited to this embodiment, and, for example, the phase of the video sync signal may be locked to the phase of an internal sync signal oscillated in the signal processor 102.

As shown in FIG. 7, the imaging apparatus 100 that allows external synchronization includes a sync signal generator 602 that outputs a video sync signal SYNC and a horizontal reference signal HREF, converters 209 and 253, optical transmitters/receivers 211 and 251, a phase controller 601, namely, a phase controller 601a (first phase controller) provided for the camera device 101 and a phase controller 601b (second phase controller) provided for the signal processor 102, and a synchronization separator 603. The horizontal reference signal HREF is substantially equivalent to a horizontal sync signal HD (or an HD signal), which is the video sync signal, although the pulse widths of the horizontal reference signal HREF and the horizontal sync signal HD differ from each other.

For example, the phase controller 601 is a PLL, the phase controller 601a is included in the controller 203 or the like, and the phase controller 601b is included in the external synchronization processing unit 259. However, the present invention is not limited to this example.

The phase controller 601 includes a phase comparator 605 (605a and 605b), a low-pass filter (LPF) 607 (607a and 607b), and a voltage controlled crystal oscillator (VCXO) 609 (609a and 609b).

In the present embodiment, the phase controller 601 may not include the LPF 607. The LPF 607 or VCXO 609 of the phase controller 601 is not limited to this embodiment.

The synchronization separator 603 receives an external sync signal, and separates the external sync signal into a horizontal sync signal HR and a vertical sync signal VR. The video sync signal generator 602 outputs the video sync signal SYNC and the horizontal reference signal HREF, by way of example. The video sync signal generator 602 may output the horizontal and vertical sync signals HD and VD, etc.

Figure 8:
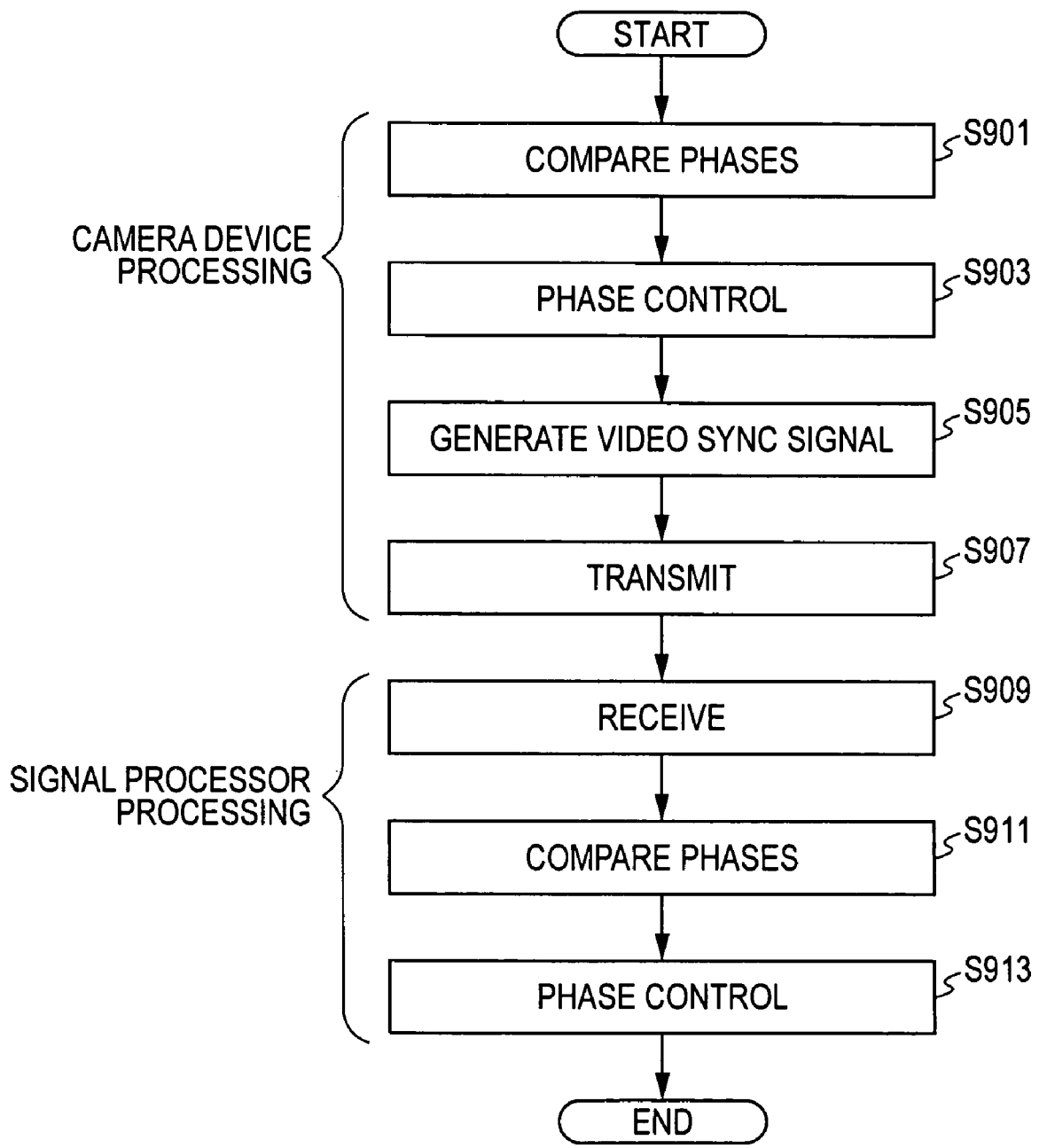
FIG. 8 is a flowchart schematically showing a phase control process according to the embodiment of the present invention.

FIG. 8 is a flowchart schematically showing a phase control process for external synchronization according to the embodiment of the present invention.

In the imaging apparatus 100 that performs external synchronization according to the present embodiment, a reference clock signal for synchronization is a clock signal output from the VCXO 609b of the signal processor 102, e.g., a 54-MHz clock signal. This clock signal is used as a sync signal (first transmission sync signal) for optical transmission from the signal processor 102 to the camera device 101.

The sync signal (first transmission sync signal) for optical transmission from the signal processor 102 to the camera device 101 is transmitted from the signal processor 102 to the camera device 101 via the optical fiber cable 105b.

Referring to FIG. 8, in the camera device 101, when the phase controller 601a receives the optical transmission sync signal (first transmission sync signal) through the converter 209, the phase comparator 605a compares the phase of the optical transmission sync signal (first transmission sync signal) with the phase of a clock signal (internal signal) output from the VCXO 609a (step S901).

If the phase comparator 605a detects a phase difference between the signals, the VCXO 609a outputs a phase-locked clock signal (internal signal) for synchronizing the phases based on a control voltage input from the LPF 607a so as to perform phase control (step S903). The phase controller 601a loops through the phase comparing processing (step S901) and the phase control processing (step S903) until the phases are locked and the transmission state becomes stable. The phase controller 601b also performs similar loop processing.

As described above, the camera device 101 also includes the VCXO 609a that outputs a reference clock signal (internal signal), e.g., a 54-MHz clock signal. This clock signal is used as a clock signal (second transmission sync signal) for optical transmission within an internal camera circuit of the camera device 101 or from the camera device 101 to the signal processor 102.

When the transmission channels of the optical fiber cable 105 become stable as a result of loop processing of the phase controller 609a, the second transmission sync signal whose phase is locked or matched to a certain phase, e.g., a 54-MHz signal, is output from the VCXO 609a of the camera device 101.

In this state, if the phase of the optical transmission sync signal transmitted from the signal processor 102 is moved, this phase movement at the signal processor 102 is passed to the phase of the clock signal reproduced by the camera device 101.

Therefore, the phase of the clock signal (internal signal) output from the VCXO 609a of the camera device 101 is associated with the movement of the phase of the optical transmission sync signal (first transmission sync signal) transmitted from the signal processor 102.

As shown in FIG. 8, the video sync signal generator 602 of the camera device 101 that generates a sync signal for a video signal is driven by the clock signal (internal signal) output from the VCXO 609a to generate the video sync signal SYNC and the horizontal reference signal HREF, which is substantially equivalent to a horizontal sync signal HD for the video sync signal SYNC (step S905).

The video sync signal SYNC and the horizontal reference signal HREF are transmitted to the signal processor 102 via the optical fiber cable 105a as a portion of the transmission data from the camera device 101 to the signal processor 102 (step S907).

In the signal processor 102, the optical transmitter/receiver 251 receives the video sync signal SYNC and the horizontal reference signal HREF (step S909). After conversion into an electrical signal and then into a parallel signal by the converter 253, the phase of the horizontal reference signal HREF is compared by the phase comparator 605b with the phase of the horizontal sync signal HR separated from the external sync signal by the synchronization separator 603 (step S911).

As described above, the VCXO 609b also performs phase control (step S913) so that the phase of the received horizontal reference signal HREF is locked to the phase of the horizontal sync signal HR of the external sync signal so that the phases. As the phase of the horizontal reference signal HREF is synchronized, the horizontal sync signal HD for the video sync signal SYNC is also synchronized.

Thus, the horizontal reference signal HREF and video sync signal SYNC whose phases are synchronized with the phase of the external sync signal are transmitted as an optical transmission sync signal (first transmission sync signal) from the signal processor 102 to the camera device 101. As a result, the phases of the video sync signal SYNC and the optical transmission sync signal, which are processed by the signal processor 102 and the camera device 101, are automatically matched to the phase of the external sync signal. Typically, such phase synchronization adjustment is performed manually depending upon the length of an optical fiber cable using an oscilloscope or the like.

In the phase control processing (step S913) according to the present embodiment, phase control is performed between the horizontal reference signal HREF and the horizontal sync signal HR. However, the present invention is not limited to this embodiment. For example, a phase difference between the horizontal sync signal HD for the video sync signal SYNC and the horizontal sync HR may be detected to perform phase control, or a phase difference between the vertical sync signal VD for the video sync signal SYNC and the vertical sync VR may be detected to perform phase control. Alternatively, a phase difference between the horizontal sync signal HD and the horizontal sync HR, and the vertical sync signal VD and the vertical sync VR may be detected to perform phase control.

Accordingly, a large PLL in which each of the camera device 101 and the signal processor 102 has a feedback loop including a long-distance transmission channel (i.e., the optical fiber cable 105) with large signal delay does not require phase locking adjustment. The vertical sync VR separated by the synchronization separator 603 is transmitted via the optical fiber cable 105b from the signal processor 102 to the video sync signal generator 602 of the camera device 101, and is reset by the video sync signal generator 602.

Figure 9:
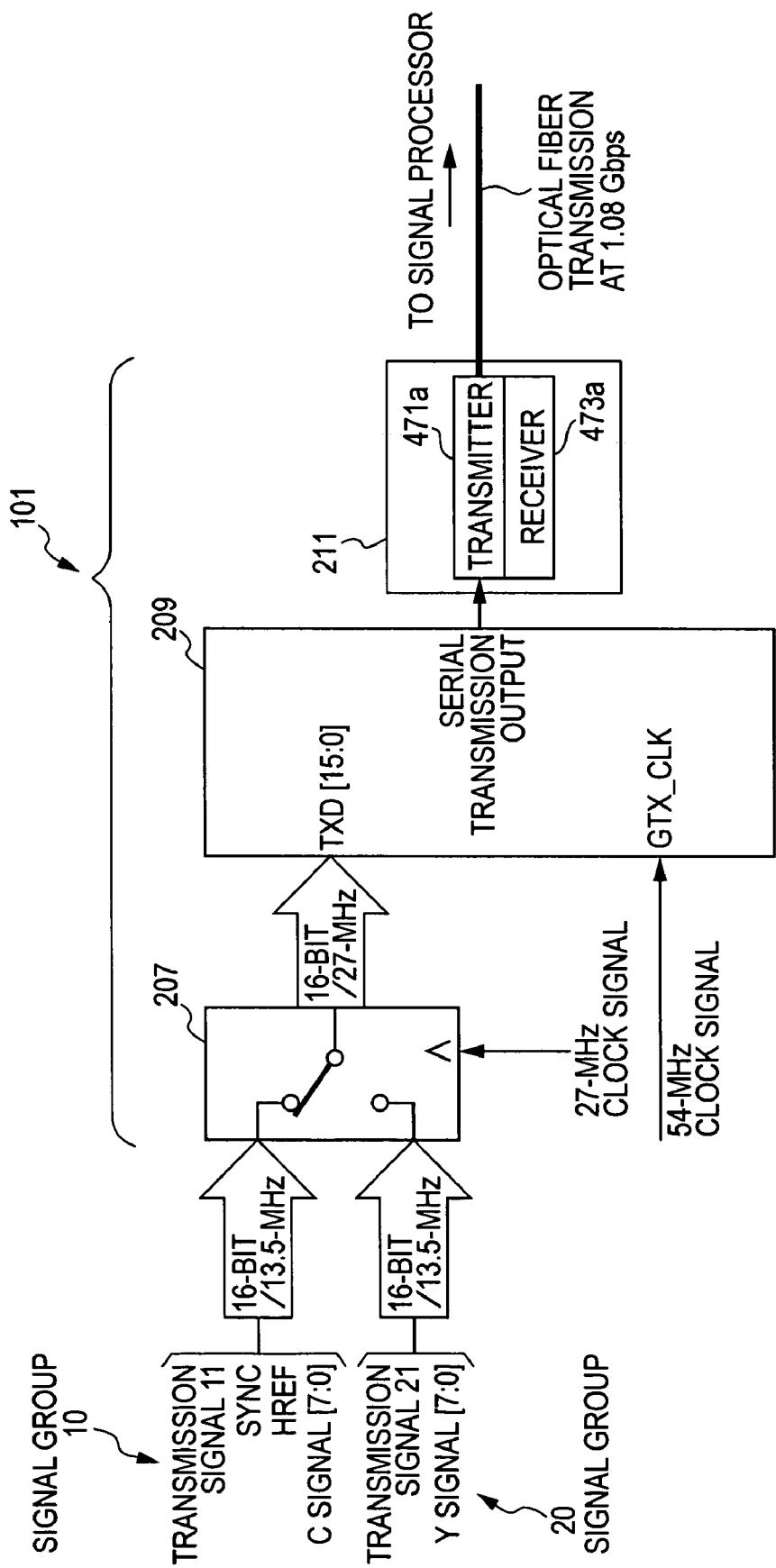
FIG. 9 is a schematic diagram showing a multiplexing process performed by a camera device according to the embodiment of the present invention.

A signal multiplexing process performed in the imaging apparatus 100 according to the embodiment of the present invention when transmitting a signal via the optical fiber cable 105 will now be described with reference to FIG. 9. FIG. 9 is a schematic diagram showing a multiplexing process performed by the camera device 101.

As shown in FIG. 9, in the camera device 101, signal groups 10 and 20 are input to the multiplexer 207 through the imaging unit 205 or the like.

Each of the signal groups 10 and 20 may be, but not limited to, a 16-bit signal. Each signal group may be a signal having any bit length. In the present embodiment, a typical digital video signal having a luminance signal (Y signal) and a chrominance signal (C signal) each having 8 bits is transmitted with a format of a data transmission rate of 13.5 MHz.

The signal group 10 includes the C signal, the video sync signal SYNC, the horizontal reference signal HREF, and a transmission signal 11. The transmission signal 11 may include, but not be limited to, a signal ID0, the horizontal sync signal HD, the vertical sync signal VD, and a signal Rx.

The signal group 20 includes the Y signal and a transmission signal 21. The transmission signal 21 may include, but not be limited, a signal ID1, a signal DISP, and a signal DISP_BLK.

The signals contained in the signal groups 10 and 20 according to the present embodiment are merely examples, and the signal groups 10 and 20 may include any other signal.

The operating clock frequency of the converter 209 ranges from, for example, 30 to 75 MHz. Thus, the converter 209 has processing performance three to five times higher than the data rate of the video signals in the signal groups 10 and 20. The frequency range of the operating clock of the converter 209 according to the present invention is not limited to that described above.

The transmission rate of the optical transmitter/receiver 211 is typically on the order of, for example, 1.25 Gbps or 2.5 Gbps. The bit rate of a serial signal output from the converter 209 is 20 times higher than the bit rate at which a parallel signal is input, and the bit rate of the input signal to the converter 209 is therefore within about 0.6 Gbps to 1.5 Gbps.

Based on the conditions, such as the bit rate, the reference clock signal for driving the converter 209 according to the present embodiment operates at a clock frequency of 54 MHz, which is four times higher than the data rate of the video signal. This frequency is merely an example, and the converter 209 may operate at any other frequency.

As shown in FIG. 9, the 2:1 multiplexer 207 operates at a frequency of 27 MHz. When the signal groups 10 and 20 are input to the multiplexer 207, the two input signals, i.e., the signal groups 10 and 20, are multiplexed 2:1 into a single signal, and the multiplexed signal is output.

As shown in FIG. 9, the multiplexed output signal is a 27-MHz signal having 16 bits. The output signal multiplexed by the multiplexer 207 is input to the converter 209 that is driven by a 54-MHz clock signal.

Since the 27-MHz signal is output from the multiplexer 207, and the converter 209 operates at a frequency of 54 MHz, the converter 209 fetches and outputs the same data two times in serial transmission output shown in FIG. 9.

Figure 10:
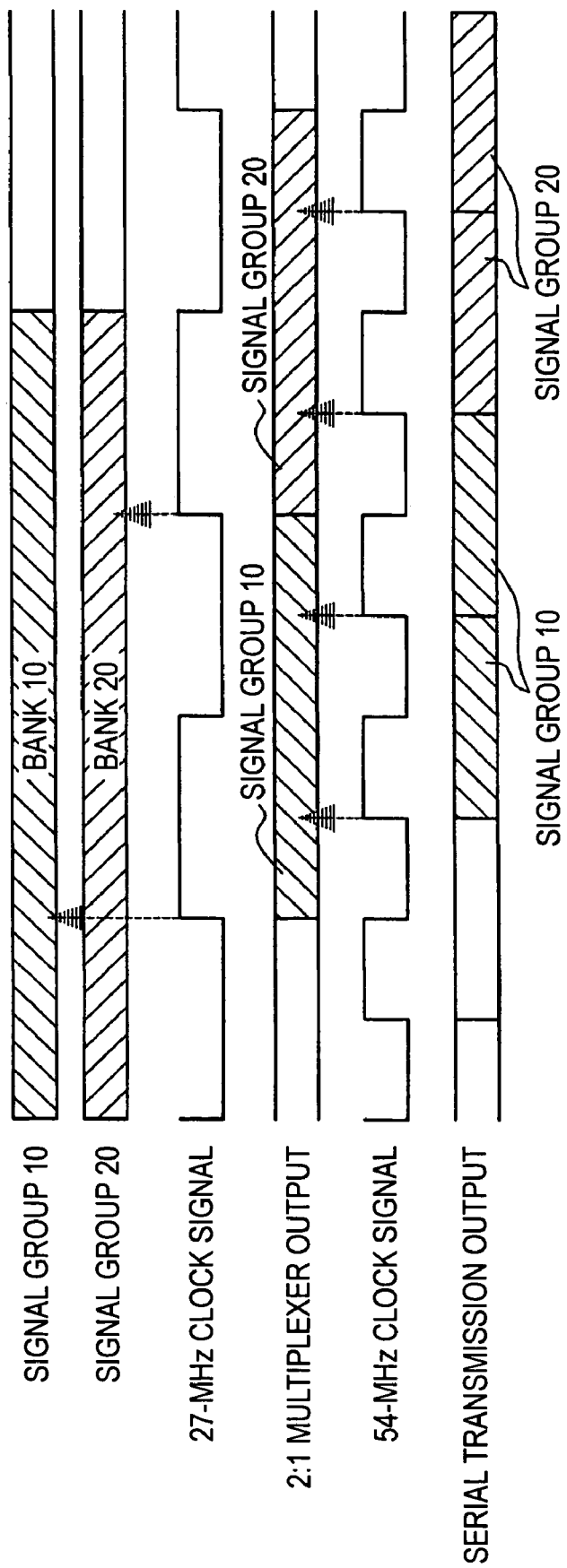
FIG. 10 is an operation time chart showing a multiplexing process performed in the imaging apparatus according to the embodiment of the present invention.

In the serial transmission output, as shown in FIG. 10, the multiplexed signal groups 10 and 20 are fetched and output two times to the optical transmitter/receiver 211. FIG. 10 is an operation time chart showing a multiplexing process performed in the imaging apparatus 100 according to the present embodiment.

Therefore, the signal transmitted from the camera device 101 to the signal processor 102 contains two identical data. The signal processor 102 processes one of the two data and ignores the other data to correctly process the data transmitted via the optical fiber cable 105.

In the signal processor 102, the demultiplexer 255 appropriately separates the transmission data multiplexed 2:1 by the multiplexer 207 into the signal groups 10 and 20.

In the multiplexing process according to the present embodiment shown in FIGS. 9 and 10, transmission data to be transmitted from the camera device 101 to the signal processor 102 is multiplexed 2:1, by way of example.

The multiplexer 207 and the demultiplexer 255 provided for the camera device 101 and the signal processor 102 allow bi-directional transmission of, for example, parallel 13.5-MHz data having 64 bits between the camera device 101 and the signal processor 102.

Accordingly, as far as the performance of devices used in the imaging apparatus 100 applies, without replacing an optical fiber cable, the amount of transmission data can be flexibly changed within the transmission performance of the optical fiber cable.

For example, in a case where the converter 209 operates at a frequency of 54 MHz, data to be transmitted from the optical transmitter/receiver 211 via the optical fiber cable 105 may be multiplexed up to 4:1.

In the illustrated embodiment, the transmission data to be transmitted from the camera device 101 to the signal processor 102 is multiplexed 2:1 by the multiplexer 207, and the multiplexed data is then transmitted via the optical fiber cable 105. However, the present invention is not limited to this embodiment, and a larger amount of transmission data may be supported, e.g., the multiplexer 207 may multiplex transmission data 4:1 with a clock signal of 54 MHz.

In the illustrated embodiment, the multiplexing process is performed by the camera device 101; however, the present invention is not limited to this embodiment. For example, the signal processor 102 may include a multiplexer, and may perform a multiplexing process.

Figure 11:
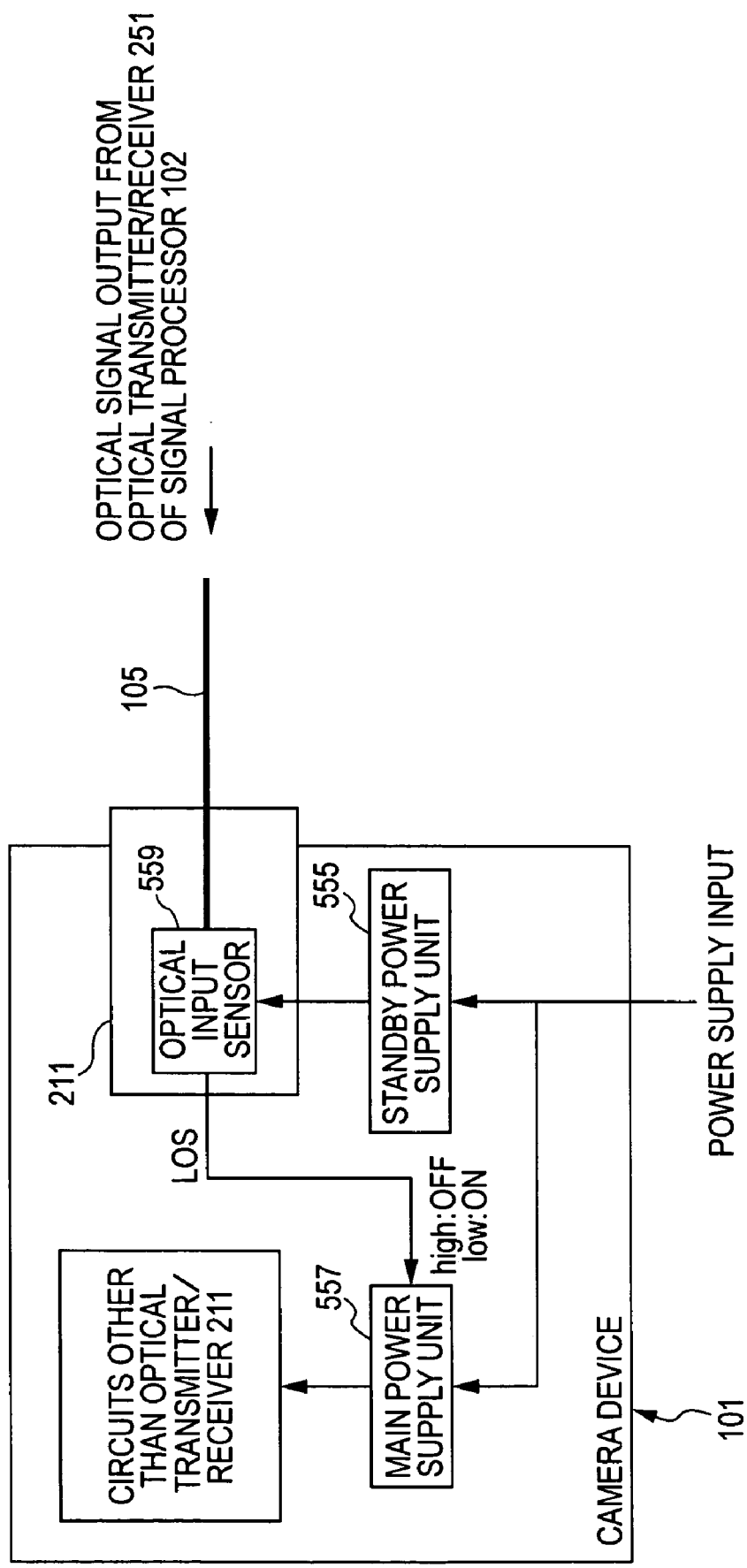
FIG. 11 is a schematic diagram showing a process for remotely controlling power supply to the camera device according to the embodiment of the present invention.

A remote control process performed by the imaging apparatus 100 according to the embodiment of the present invention in which power supply to the camera device 101 is remotely controlled by the signal processor 102 via the optical fiber cable 105 will now be described with reference to FIG. 11. FIG. 11 is a schematic diagram showing a process for remotely controlling power supply to the camera device 101 according to the embodiment of the present invention.

In the imaging apparatus 100 according to the present embodiment, power to the imaging unit 205 is supplied from a local power supply, rather than the signal processor 102. In the imaging apparatus 200 of the related art shown in FIG. 2, the camera power supply unit 310 remotely supplies power through the cable 305.

Without the ability of the signal processor 102 to turn on and off power supply to the imaging unit 205, power is constantly supplied to the imaging unit 205 and power consumption is wasted more than necessary even though power supply only to the signal processor 102 is turned off.

In order to overcome such wasted power consumption, as shown in FIG. 11, the camera device 101 includes a main power supply unit 557, a standby power supply unit 555 for use in a standby mode, and an optical input sensor 559. The main power supply unit 557 supplies power to the components other than the optical transmitter/receiver 211, such as the imaging unit 205 and the control unit 203, so that power can be supplied to the power supply system in the overall circuit of the camera device 101. The optical input sensor 559 detects an optical signal from the signal processor 102 when the signal processor 102 is in an operation mode, and detects no optical signal when the signal processor 102 is out of operation.

As shown in FIG. 11, the standby power supply unit 555 supplies power only to the optical transmitter/receiver 211 of the camera device 101 to activate the optical transmitter/receiver 211. In the camera device 101, the circuits other than the optical transmitter/receiver 211 are activated by power supply from the main power supply unit 557.

The standby power supply unit 555 and the main power supply unit 557 receive power supply from the power supply unit 215 serving as a local power supply.

When the signal processor 102 is in a powered-off state, a laser beam, which is an optical signal, does not reach the optical transmitter/receiver 211 of the camera device 101. In this state, the optical input sensor 559 of the optical transmitter/receiver 211 determines that no optical signal is input, and outputs a high signal LOS (Loss Of Signal).

When the optical input sensor 559 detects a laser beam, it outputs a low signal LOS. In response to the low signal LOS, the main power supply unit 557 supplies power. When the signal LOS is high, the main power supply unit 557 does not supply power.

Therefore, the signal processor 102 can control power supply from the main power supply unit 557 of the camera device 101. The high or low determination of the signal LOS is a simple determination based on the input level, and is still effective if word synchronization of transmission data, described above, is not established. For example, even in the standby mode in which power is supplied only from the standby power supply unit 555 and the converter 209, etc., of the camera device 101 are not operating, power supply can reliably be controlled.

Accordingly, in the imaging apparatus 100 according to the embodiment of the present invention, the camera device 101 and the signal processor 102 may be located in different distant places and can be remotely operated.

According to the present invention, advantageously, the imaging apparatus 100 does not require complex connection of the multi-core cable 305, which is essential to the imaging apparatus 200 of the related art shown in FIG. 2, and only requires, for example, the single two-fiber optical fiber cable 105, which is thinner and lighter than the multi-core cable 305. Therefore, the imaging apparatus 100 can be easily installed indoors.

According to the present invention, furthermore, the optical fiber cable 105 in the imaging apparatus 100 may be implemented as a general-purpose two-fiber cable. Thus, the cable cost can be reduced compared to the dedicated multi-core cable 305 in the imaging apparatus 200 of the related art shown in FIG. 2.

Moreover, digital multiplexed transmission signals are transmitted via the optical fiber cable 105. Therefore, due to characteristics of the digital signals, signal degradation caused by long-distance transmission can be prevented compared to analog signal transmission.

Multiplexing transmission signals allows signals to be changed and added without replacing a cable connecting the camera device 101 and the signal processor 102, and a flexible system is therefore realized.

Optical transmission prevents spurious radiation induced by cable extension, and therefore long-distance transmission via the extended cable and other electrical lines is not affected by induced noise.

Optical connection, rather than electrical connection, between the camera device 101 and the signal processor 102 prevents the occurrence of malfunction or damage of or ground noise in the circuits of the camera device 101 or the signal processor 102 due to a ground potential difference between the distant locations.

In a case where the signal processor 102 applies external synchronization, a PLL including the optical fiber cable 105 can easily be constructed, and the phases of signals of both the camera device 101 and the signal processor 102 can automatically be synchronized with the phase of an external sync signal. Thus, there is no need for phase locking adjustment, which is generally required for signal delay on transmission channels.

The camera device 101 that is operated by a local power supply can be powered on and off by detecting the presence or absence of an optical signal from the signal processor 102, and the consumption power can therefore be minimized when the imaging apparatus 100 is out of operation.

The optical transmitters/receivers 211 and 251 may be replaceable SFP modules, and therefore a single-mode or multi-mode optical fiber cable can be used depending upon the transmission distance. An existing optical fiber cable may be plugged to an appropriate SFP module to the specification of the optical fiber cable to transmit optical signals.

The camera device 101 and the signal processor 102 can apply external synchronization using an external sync signal from an external device, such as a switcher. Thus, video from a plurality of camera devices 101 can alternately be changed remotely via an optical fiber cable.

A display device may be connected to the signal processor 102 to sequentially display video from the switched camera devices 101 on the display device, and the operator can easily view the video of a desired camera device or devices 101.

A video signal can be transmitted from the camera device 101 to the signal processor 102 distant from the camera device 101 via an optical fiber cable, and a signal for remotely operating the camera device 101 can be transmitted from the signal processor 102. Thus, high-quality video signals can be transmitted without complex cable installation.

While preferred embodiments of the present invention have been described with reference to the drawings, the present invention is not limited to these embodiments. It is to be anticipated by those skilled in the art that a variety of modifications or changes may be made without departing from the technical scope of the present invention and these modifications or changes also fall within the technical scope of the present invention.

What is claimed is:

1. An imaging apparatus comprising at least one camera device that photographs an object, a signal processor that receives a video signal from the camera device, and a connection cable connecting the camera device and the signal processor, the camera device comprising:
 a first phase controller that compares the phase of a synchronization signal transmitted from the signal processor with the phase of an internal signal generated by the camera device, and that controls the phase of the internal signal so as to be synchronized with the phase of the synchronization signal;
 a video synchronization signal generator that generates a video synchronization signal that is a synchronization signal for the video signal based on the internal signal whose phase is synchronized with the phase of the synchronization signal transmitted from the signal processor; and
 a signal transmitter that transmits at least the video signal via the connection cable,
the signal processor comprising a second phase controller that compares the phase of the video synchronization signal with the phase of the synchronization signal transmitted from the signal processor, and that controls the phase of the video synchronization signal so as to be synchronized with the phase of the synchronization signal.

2. The imaging apparatus according to claim 1, wherein the video synchronization signal comprises a horizontal synchronization signal.

3. The imaging apparatus according to claim 1, wherein the connection cable comprises an optical fiber cable.

4. The imaging apparatus according to claim 1, wherein the signal transmitter includes a multiplexer that multiplexes at least the video signal.

5. The imaging apparatus according to claim 4, wherein the connection cable comprises an optical fiber cable, and the multiplexer multiplexes at least the video signal so as to be transmitted via the optical fiber cable.

6. The imaging apparatus according to claim 1, wherein the phase of the synchronization signal is synchronized with the phase of an external synchronization signal transmitted from an external device.

7. The imaging apparatus according to claim 1, wherein the second phase controller outputs a second transmission synchronization signal whose phase is synchronized with the phase of an external synchronization signal transmitted from an external device.

8. A phase control method for an imaging apparatus comprising at least one camera device that photographs an object, a signal processor that receives a video signal from the camera device, and a connection cable connecting the camera device and the signal processor, the phase control method comprising:
 comparing the phase of a synchronization signal transmitted from the signal processor with the phase of an internal signal generated by the camera device;
 controlling the phase of the internal signal so as to be synchronized with the phase of the synchronization signal;
 generating a video synchronization signal that is a synchronization signal for the video signal based on the internal signal whose phase is synchronized with the phase of the synchronization signal;
 transmitting at least the video signal from the camera device to the signal processor via the connection cable;
 comparing the phase of the video synchronization signal with the phase of the synchronization signal; and
 controlling the phase of the video synchronization signal so as to be synchronized with the phase of the synchronization signal.

9. The phase control method according to claim 8, wherein the video synchronization signal comprises a horizontal synchronization signal.

10. The phase control method according to claim 8, wherein the connection cable comprises an optical fiber cable.

11. The phase control method according to claim 8, further comprising multiplexing at least the video signal.

12. The phase control method according to claim 8, wherein the phase of the synchronization signal is synchronized with the phase of an external synchronization signal transmitted from an external device.

13. The phase control method according to claim 8, further comprising outputting from the signal processor a second transmission synchronization signal whose phase is synchronized with the phase of an external synchronization signal transmitted from an external device.

* * * * *